United States Patent [19]  [11] 4,155,984
Cohen et al.  [45] May 22, 1979

[54] RECOVERY OF $H_2SO_4$ ACID

[75] Inventors: Joseph Cohen, Gardanne; Alain Adjemian, Aix-en-Provence, both of France

[73] Assignee: Aluminium Pechiney, Lyons, France

[21] Appl. No.: 733,858

[22] Filed: Oct. 19, 1976

[30] Foreign Application Priority Data

Oct. 20, 1975 [FR] France ................................ 75 32026

[51] Int. Cl.² ........................ C01G 23/00; C01B 17/90
[52] U.S. Cl. ........................................ 423/81; 423/85; 423/143; 423/531; 423/517
[58] Field of Search ................... 423/531, DIG. 2, 81, 423/83, 85, 143, 517, 545; 203/33, 35

[56] References Cited

U.S. PATENT DOCUMENTS

| 3,057,685 | 10/1962 | Kamlet | 423/81 |
| 3,984,312 | 10/1976 | Dulin et al. | 423/DIG. 2 |

FOREIGN PATENT DOCUMENTS 251412  5/1964  Australia ................................ 423/531

*Primary Examiner*—O. R. Vertiz
*Assistant Examiner*—Thomas W. Roy
*Attorney, Agent, or Firm*—Dennison, Dennison, Meserole & Pollack

[57] ABSTRACT

Process for the recovery of $H_2SO_4$ from dilute sulfuric acid solutions containing combined acid sulfates by heating these solutions in the presence of excess ammonium sulfate to a temperature from between about 100° and 160° C. until a concentration of free $H_2SO_4$ between 50 and 59% by weight is obtained to precipitate the combined acid sulfates.

2 Claims, No Drawings

RECOVERY OF H₂SO₄ ACID

The present invention relates to the recovery of $H_2SO_4$ from dilute sulfuric acid solutions containing at least one of the metals iron and titanium in the form of sulfates, possibly in addition to other metal sulfates, for example those of aluminum, magnesium and sodium.

It is known that the processes for treating silico-aluminous minerals with sulfuric acid give rise to the formation of such solutions, and an attempt is generally made to recycle them. The primary object of this recycling is not to lose or discard the often large amounts of sulfuric acid which they contain. However, it is necessary that the dissolved sulfates are removed in a sufficient amount so that the residual quantities do not deleteriously affect the attack by the sulfuric acid or reduce the quality of the desired main product; it is clearly advantageous to perform this removal of undesirable combined acid sulfates under the most energetic conditions which will enable valuable elements to be recovered and the solutions to be purified at one and the same time. The process of the invention is especially suitable for such solutions.

It is known that iron can be removed in the form of the double ferric and potassium sulfate, and this precipitate brings down some of the other impurities. However, this method of removal assumes that potassium sulfate is present in the solution and that there is a high iron/titanium ratio.

The process according to the invention is based on the newly established fact that most of the iron and titanium present in the form of ferric sulfate and titanyl sulfate in a dilute sulfuric acid-containing solution not containing potassium can be removed even if the iron/titanium ratio is not very great, by concentrating this solution to a free $H_2SO_4$ concentration of the order of 50 to 59%, and if the said concentration is carried out in the presence of ammonium sulfate. By suitably selecting the operating conditions the greater part of the iron and titanium is extracted in the form of a complex precipitate in which crystals of a ferri-ammonium sulfate and crystals of an ammonium-titanyl double sulfate may be identified, together with a third solid phase which appears to be a ternary sulfate of iron, titanium and ammonium.

The applicants have also found that this precipitate additionally contains other impurities such as magnesium in the form of sulfate, and phosphorous in an unidentified form.

In its simplest embodiment the process consists of adding excess ammonium sulfate to the dilute solution being treated, if the latter does not contain a sufficient amount thereof, evaporating this solution by heating to a temperature between 100° and 160° C., preferably between 110° and 120° C. until a concentration of free sulfuric acid of between 50 and 59% by weight of solution is obtained, allowing this solution to stand while stirring for 2 to 3 hours at the heating temperature in the presence of seed crystals, and finally, at the end of this period of time, separating the solution and the precipitate obtained.

The term excess ammonium sulfate means that the amount of ammonium initially present in the form of sulfate should be very much greater than the amount which would correspond to the complete incorporation of this sulfate in complex salts of the types $Fe_2(SO_4)_3 \cdot (NH_4)_2SO_4$ and $TiO(SO_4) \cdot (NH_4)_2SO_4$ containing the total amount of ferric iron and titanyl oxide initially present.

The presence of seed crystals from a previous operation in an amount of 0.5 to 3% by weight of solution is a condition for the rapid precipitation of the desired complex precipitate.

It has been found that a standing time of more than 3 hours does not notably increase the amount of precipitate formed.

The stirring should be sufficient to prevent the settling of solid particles.

Concentration is preferably carried out in a multipleeffect evaporator operating in vacuo to reduce energy consumption, and at a relatively low temperature so as to reduce the risk of corrosion damage to the apparatus.

According to a particular but non-essential provision of the invention, if a solution is available containing less than 44–47% of free $H_2SO_4$, a first evaporation may be performed up to a temperature of approximately 80° C. which results in this concentration, and a first precipitation is allowed to take place at this temperature for 2 to 3 hours, while stirring, the following phase being, as already described, an evaporation at a temperature between 100° and 160° C., preferably between 100° and 120° C., to a concentration of 50 to 59% of free $H_2SO_4$.

According to the invention effluents may be treated which are extracted at various points from processes supplying residual sulfuric acid solutions containing ferric sulfate and/or titanyl sulfate, these solutions resulting directly from the process or from an oxidation operation on residual sulfuric acid solutions containing ferrous sulfate and/or a sulfate of divalent titanium.

These effluents may have varying compositions, and the solution subjected to the process may be formed from a mixture of at least two of them. A single effluent may also be subjected to a first evaporation and a crystallization at 80° C. in the presence of seed crystals, the other effluents then being mixed with the first effluent only after this first crystallization.

The following examples will enable the process according to the invention to be better understood. The amounts given refer to 1000 g of starting solution.

Example 1

An effluent mixture was taken, derived from the treatment of a silico-aluminous mineral by a sulfuric acid solution containing by weight 62% of total $H_2SO_4$ and 54% of free $H_2SO_4$.

The mixture of these effluents contains:
0.94% $Al_2O_3$ in the form of aluminum sulfate
0.30% of $Fe_2O_3$ in the form of ferric sulfate
0.37% of $TiO_2$ in the form of titanyl sulfate
2.47% of $NH_3$ in the form of ammonium sulfate
41.44% of total $SO_3$, 32.6% being in the form of free $H_2SO_4$
45.2% of water (calculated by difference).

After adding 11.6 g of seed crystals from a previous operation per 1000 g of solution, the suspension was evaporated at a temperature of 110° C., resulting in the removal of 267 g of water per 1000 g of starting solution. After this evaporation the suspension contained 54.3% of free $H_2SO_4$. This suspension was kept for 3 hours at this temperature (110° C.) while stirring, for example by mechanical means or the injection of air. The suspension was filtered which, per 1000 g of starting solution, resulted in the separation of 656 g of a solution containing not more than 0.31% of TiO$_2$, i.e. 2.06 g, 0.11% of Fe$_2$O$_3$, i.e. 0.73 g, 1.10% of Al$_2$O$_3$, i.e. 7.2 g, and 57% of total SO$_3$. Thus, 44.9% of the titanium and 74.8% of the iron initially present were precipitated, but only 23% of Al$_2$O$_3$ was precipitated.

Example 2

Two effluents were used, obtained from two different points of a treatment process of a silico-aluminous mineral with a sulfuric acid solution having a concentration of free sulfuric acid of 54% and a total SO$_3$ concentration of 50.6%.

The first effluent contained:
1.11% of Al$_2$O$_3$ in the form of aluminum sulfate
0.41% of Fe$_2$O$_3$ in the form of ferric sulfate
0.56% of TiO$_2$ in the form of titanyl sulfate
3.07% of NH$_3$ in the form of ammonium sulfate, and
49.7% of total SO$_3$ (free SO$_3$+combined SO$_3$).

The second effluent contained per 1000 g of solution:
0.75% of Al$_2$O$_3$ in the form of aluminum sulfate
0.35% of Fe$_2$O$_3$ in the form of ferric sulfate
0.34% of TiO$_2$ in the form of titanyl sulfate
1.82% of NH$_3$ in the form of ammonium sulfate
32.8% of total SO$_3$.

Seed crystals from a previous operation were added in an amount of 21 g of crystals per 979 g and the whole was maintained at 80° C. for three hours. There was no notable evaporation.

869 g of the second effluent were added per 1000 g of the suspension obtained and the whole was heated to 110° C., 478 g of water being evaporated per 1869 g of mixture. This concentrated suspension was then maintained at 110° C. for 3 hours while stirring, and was then filtered. Thus, for 979 g of the first effluent and 869 g of the second effluent 1194 g of a solution were separated containing 0.19% of TiO$_2$, 0.035% of Fe$_2$O$_3$, 1.2% of Al$_2$O$_3$ and 56.6% of total SO$_3$.

The removal efficiency was 73% for TiO$_2$ and 94.1% for Fe$_2$O$_3$, and only 18.7% of Al$_2$O$_3$.

Example 3

A mixture of various effluents, the so-called "starting solution" was used, which contained:
1.04% of Al$_2$O$_3$ in the form of aluminum sulfate
0.42% of Fe$_2$O$_3$ in the form of ferric sulfate
0.49% of TiO$_2$ in the form of titanyl sulfate
37.2% of total SO$_3$, which would correspond to a content of free H$_2$SO$_4$ of 41.2%.

10 g of (NH$_4$)$_2$SO$_4$ were added per 100 g of this solution, 3 g of seed crystals from a previous operation were added thereto, and the whole was heated at 80° C. for 3 hours. This operation did not cause any notable evaporation. The suspension was then heated to and maintained at 110° C. in vacuo, which caused the evaporation of 332 g of water per 1000 g of starting solution, and the concentrated suspension obtained was kept at 110° C. for 3 hours.

The suspension was then filtered and 721 g of a solution were obtained, per 1000 g of starting solution, containing 0.15% of TiO$_2$, 0.03% of Fe$_2$O$_3$, 1.0% of Al$_2$O$_3$ and 55.4% of free H$_2$SO$_4$. The removal yield for TiO$_2$ was 78%, that for Fe$_2$O$_3$ was 95%; only 30% of Al$_2$O$_3$ was eliminated.

Example 4

Two effluents were used, obtained from a treatment process of a silico-aluminous mineral with a sulfuric acid solution containing 62% of total H$_2$SO$_4$ and 54% of free H$_2$SO$_4$.

The first effluent contained:
1.4% of Al$_2$O$_3$ in the form of aluminum sulfate
0.47% of Fe$_2$O$_3$ in the form of ferric sulfate
0.51% of TiO$_2$ in the form of titanyl sulfate
0.57% of MgO in the form of magnesium sulfate
0.23% of P$_2$O$_5$
3.0% of NH$_3$ in the form of ammonium sulfate
37.8% of free H$_2$SO$_4$.

The second effluent contained:
0.7% of Al$_2$O$_3$ in the form of aluminum sulfate
0.43% of Fe$_2$O$_3$ in the form of ferric sulfate
0.23% of TiO$_2$ in the form of titanyl sulfate
0.31% of MgO in the form of magnesium sulfate
0.12% of P$_2$O$_5$
1.6% of NH$_3$ in the form of ammonium sulfate
40.2% of free H$_2$SO$_4$.

Seed crystals from a previous operation were added to the first effluent in an amount of 22 g per 1000 g, and the whole was kept for 3 hours at 80° C.

The second effluent was added to the suspension obtained in an amount of 1131 g of effluent per 1000 g of suspension and the whole was heated to 110° C. and evaporated in vacuo at this temperature, 531 g of water being evaporated for 2131 g of mixture. This concentrated suspension was then maintained at 110° C. for 3 hours while stirring, following which it was filtered. Thus, for 978 g of the first effluent and 1131 g of the second effluent, 1331 g of a solution was separated, containing:
1.29% of Al$_2$O$_3$
0.04% of Fe$_2$O$_3$
0.16% of TiO$_2$
0.52% of MgO
0.22% of P$_2$O$_5$
3.28% of NH$_3$
53.7% of free H$_2$SO$_4$ The removal yield was:
74.7% for TiO$_2$
96.5% for Fe$_2$O$_3$
25.9% for MgO
18.7% for P$_2$O$_5$
and only 20.6% for Al$_2$O$_3$

Example 5

Two effluents were used, obtained from a treatment process of a silico-aluminous mineral with a sulfuric acid solution containing 62% of total H$_2$SO$_4$ and 54% of free H$_2$SO$_4$.

The first effluent contained:
1.23% of Al$_2$O$_3$ in the form of aluminum sulfate
0.39% of Fe$_2$O$_3$ in the form of ferric sulfate
0.46% of TiO$_2$ in the form of titanyl sulfate
0.54% of MgO in the form of magnesium sulfate
0.22% of P$_2$O$_5$
3.0% of NH$_3$ in the form of ammonium sulfate
44.5% of free H$_2$SO$_4$.

The second effluent contained:
0.84% of Al$_2$O$_3$ in the form of aluminum sulfate
0.26% of Fe$_2$O$_3$ in the form of ferric sulfate
0.32% of TiO$_2$ in the form of titanyl sulfate
0.40% of MgO in the form of magnesium sulfate
0.11% of P$_2$O$_5$
1.8% of NH$_3$ in the form of ammonium sulfate
31.6% of free H$_2$SO$_4$.

Seed crystals from a previous operation were added to the first effluent in an amount of 20 g per 1000 g, and the whole was maintained for 3 hours at 80° C.

The second effluent was added to the suspension obtained in an amount of 828 g per 1000 g of suspension, and the whole was heated to 110° C. and evaporated in vacuo at this temperature, 540 g of water being evaporated per 1828 g of mixture. This concentrated suspension was then maintained at 110° C. for 3 hours while stirring, following which it was filtered. Thus, for 980 g of the first effluent and 828 g of the second effluent, 962 g of a solution was separated, containing:

0.7% of $Al_2O_3$
0.01% of $Fe_2O_3$
0.001% of $TiO_2$
0.40% of MgO
0.12% of $P_2O_5$
3.36% of $NH_3$
58.8% of free $H_2SO_4$.

The removal yield was:
99.9% for $TiO_2$
98.5% for $Fe_2O_3$
55.3% for MgO
62.4% for $P_2O_5$, and
64.6% for $Al_2O_3$.

Within the terms of the appended claims many variations and modification of the procedure described may be practiced without departure from the essence of our invention.

We claim:

1. A method of recovering $H_2SO_4$ acid for recycle from dilute $H_2SO_4$ acid liquor obtained from processes for treating minerals and containing at least iron and titanium acid sulfate contaminants, which comprises the sequential steps of:
   (a) adding ammonium sulfate to the liquor in an amount in excess of the stoichiometric amount required to form complex sulfates of the contaminant acid sulfates,
   (b) concentrating the ammonium sulfatecontaining liquor at a temperature from between 100° to 160° C. until the concentration of free sulfuric acid is from between about 50 to 59% by weight of the liquor,
   (c) seeding the concentrated liquor with about 0.5 to 3.0% by weight of crystals of double sulfates of $Fe_2(SO_4)_3 \cdot (NH_4)_2SO_4$ and $TiO(SO_4) \cdot (NH_4)_2SO_4$,
   (d) agitating the seeded concentrated liquor for about 2 to 3 hours at said temperature whereby the sulfate contaminants are substantially precipitated as substantially neutral complex sulfates, and
   (e) separating the precipitated complex sulfates to recover the $H_2SO_4$ for recycle.

2. A method as claimed in claim 1, wherein a first dilute acid liquor to be processed is preheated at a temperature up to about 80° C. and subjected to a first evaporation and crystallization at about 80° C. to derive a dilute acid liquor containing more than about 44 to 47% free $H_2SO_4$ prior to blending with a second dilute acid liquor to be processed by said sequential steps.

* * * * *